United States Patent
Wilson

(10) Patent No.: US 10,239,092 B2
(45) Date of Patent: Mar. 26, 2019

(54) METHOD FOR PRINTING ON FLEXIBLE LOW SURFACE ENERGY SUBSTRATES

(71) Applicant: HYPERFORM, INC., Rockledge, FL (US)

(72) Inventor: Kurt Wilson, Cocoa Beach, FL (US)

(73) Assignee: Hyperform, Inc., Rockledge, FL (US)

( * ) Notice: Subject to any disclaimer, the term of this patent is extended or adjusted under 35 U.S.C. 154(b) by 0 days.

(21) Appl. No.: 15/725,080

(22) Filed: Oct. 4, 2017

(65) Prior Publication Data
US 2018/0093298 A1 Apr. 5, 2018

Related U.S. Application Data

(60) Provisional application No. 62/404,114, filed on Oct. 4, 2016.

(51) Int. Cl.
*B05D 1/02* (2006.01)
*B05D 1/26* (2006.01)
(Continued)

(52) U.S. Cl.
CPC .......... *B05D 7/57* (2013.01); *B05D 1/26* (2013.01); *B05D 1/305* (2013.01); *B05D 1/36* (2013.01); *B05D 1/38* (2013.01); *B05D 3/0406* (2013.01); *B05D 7/04* (2013.01); *B05D 7/534* (2013.01); *B05D 7/536* (2013.01); *B05D 7/576* (2013.01); *B41J 2/01* (2013.01); *B41J 2/205* (2013.01); *B41J 2/21* (2013.01); *B41J 2/2107* (2013.01); *B41J 3/407* (2013.01); *B41M 5/0017* (2013.01); *B41M 5/0047* (2013.01); *B41M 7/0045* (2013.01); *C08J 7/042* (2013.01); *B05D 1/02* (2013.01); *B05D 1/28* (2013.01); *B05D 3/067* (2013.01); *B05D 5/04* (2013.01); *B05D 7/02* (2013.01); *B05D 7/574* (2013.01);
(Continued)

(58) Field of Classification Search
CPC ... B05D 1/02; B05D 1/26; B05D 1/28; B05D 1/305; B05D 1/36; B05D 1/38; B05D 3/0406; B05D 5/04; B05D 7/02; B05D 7/04; B05D 7/534; B05D 7/536; B05D 7/574; B05D 7/576; B05D 2201/00; B05D 2201/02; B05D 2350/60; B41J 2/01; B41J 2/205; B41J 2/21; B41J 2/2107; B41J 3/407
USPC ......... 347/1, 102; 427/511, 558, 258, 372.2, 427/379, 384, 412.1, 413, 420, 421.1, 427/427.6, 428.01
See application file for complete search history.

(56) References Cited

U.S. PATENT DOCUMENTS 5,540,610 A * 7/1996 Sneddon ............... A63H 33/18
446/236

FOREIGN PATENT DOCUMENTS

WO WO-02085638 A1 * 10/2002 .......... B41M 7/0081

* cited by examiner

*Primary Examiner* — William P Fletcher, III
(74) *Attorney, Agent, or Firm* — Stephen C. Thomas

(57) ABSTRACT

A method for printing on a low surface energy substrate. The low surface energy substrates may be flexible low surface energy substrates. A primer is applied to the surface of the low surface energy substrate using a spray coating system. A pressure pot spray system that oscillates as the substrate passes underneath it on a conveyor system may be used. The primer is then allowed to air dry. Once dry, a printer can be used to print a graphic, design or other ornamental feature on the primed surface of the substrate. Once printing is complete, a clear coating is applied to the substrate and then cured.

8 Claims, 1 Drawing Sheet

(51) Int. Cl.
*B05D 1/28* (2006.01)
*B05D 1/30* (2006.01)
*B05D 1/36* (2006.01)
*B05D 1/38* (2006.01)
*B05D 3/04* (2006.01)
*B05D 3/06* (2006.01)
*B05D 5/04* (2006.01)
*B05D 7/00* (2006.01)
*B05D 7/02* (2006.01)
*B05D 7/04* (2006.01)
*B41J 2/01* (2006.01)
*B41J 2/21* (2006.01)
*B41M 5/00* (2006.01)
*B41M 7/00* (2006.01)
*C08J 7/04* (2006.01)
*B41J 2/205* (2006.01)
*B41J 3/407* (2006.01)

(52) U.S. Cl.
CPC ...... *B05D 2201/00* (2013.01); *B05D 2201/02* (2013.01); *B05D 2350/60* (2013.01); *B05D 2530/00* (2013.01); *B41M 5/0064* (2013.01); *C08J 2323/06* (2013.01); *C08J 2331/04* (2013.01); *C08J 2421/00* (2013.01)

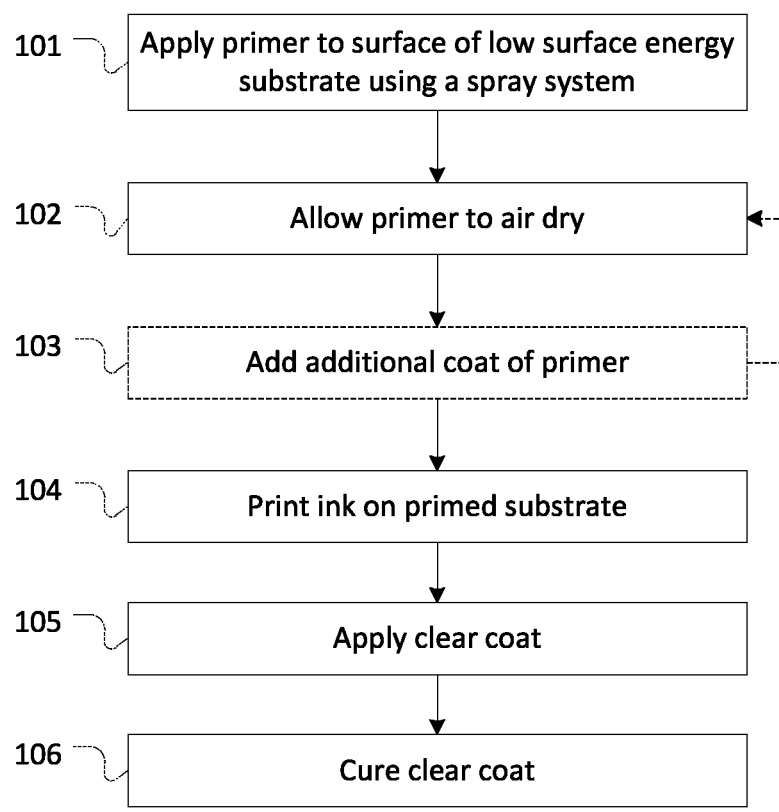

METHOD FOR PRINTING ON FLEXIBLE LOW SURFACE ENERGY SUBSTRATES

RELATED APPLICATIONS

This non-provisional application for patent is a non-provisional of U.S. provisional patent application Ser. No. 62/404,114 filed in the United States Patent and Trademark Office (USPTO) on Oct. 4, 2016, titled PRINTING ON LOW SURFACE ENERGY SUBSTRATES, which is hereby incorporated by reference in its entirety.

FIELD OF INVENTION

The present disclosure relates to printing on low surface energy substrates.

BACKGROUND

Flexible low surface energy substrates, such as, for example, ethylene-vinyl acetate (EVA) foam, are used for numerous applications including marine and other aquatic applications. For example, closed cell EVA traction pads are applied to boat decks to provide a padded, non-skid surface. Printing designs and graphics on such surfaces using ink is difficult since adhesion is generally poor, if there is any adhesion at all. Those inks that do bond well are easily removed, which detracts from their usability for permanent marking applications. Heating the substrate prior to printing can be an effective means for improving the adherence of ink to the substrate; however, heating can result in unacceptable damage to the substrate. Printable wrap films have also been used to apply graphic designs to flexible low surface energy substrates; however, such films do not always bond to the substrate well, may come off or delaminate over time and also may limit the flexibility of the substrate. Known methods not only have low ink durability, their use also results in loss of wet and dry traction, which is problematic for marine and other aquatic applications. What is needed in the art is a method of printing on low surface energy substrates that provides a more effective and resilient ink bond to the substrate and maintains the characteristics of the substrate, such as, for example, flexibility.

SUMMARY OF THE INVENTION

In accordance with the teachings disclosed herein, embodiments related to a method for printing on low surface energy substrates are disclosed.

In an embodiment, a method for printing on low surface energy substrates comprises applying a primer to a surface of the low surface energy substrate using a coating system. The low surface energy substrate may be a flexible low surface energy substrate. Such a flexible low surface energy substrate may comprise one or more of the following substrates: thermoplastic polyolefin, polypropylene, polyethylenes (PE), polystyrene, nylon, and EVA. The flexible low surface energy substrate may comprise PE, EVA, talc, calcium carbonate ($CaCO_3$), zine dioxide (ZnO), dicumyl peroxide, and azodicarbonamide. The spray coating system may be an automated pressure pot spray system. The primer may be a flexible, non-slip, durable, rubber coating. One or more additional coats of primer may be applied. The method further comprises allowing the primer to dry and then printing ink on the primed substrate. Printing may be performed by a UV flatbed inkjet printer. After printing, a clear coat is applied to the primed and printed substrate and the clear coat is cured. The clear coat may be applied using a roll coater or a curtain coater.

BRIEF DESCRIPTION OF THE DRAWINGS

FIG. 1 is a flowchart of a method of printing on low surface energy substrates according to an embodiment of the present invention.

DETAILED DESCRIPTION OF THE PREFERRED EMBODIMENTS

A detailed description of the embodiments for a method for printing on low surface energy substrates will now be presented with reference to FIG. 1. One of skill in the art will recognize that these embodiments are not intended to be limitations on the scope, and that modifications are possible without departing from the spirit thereof. In certain instances, well-known methods, procedures, components, and circuits have not been described in detail.

A flowchart of an embodiment of a method for printing on low surface energy substrates is shown in FIG. 1. The low surface energy substrates may be flexible low surface energy substrates. Examples of flexible low surface energy substrates include thermoplastic polyolefin, polypropylene, PE, polystyrene, nylon, and EVA. Flexible low surface energy substrates used with embodiments of the invention may include a combination of flexible low surface energy substrates or a combination of flexible low surface energy substrates and other materials. As an example, a flexible low surface energy substrate used with embodiments of the invention may include a PE/EVA foam that comprises PE, EVA, talc, calcium carbonate ($CaCO_3$), zine dioxide (ZnO), dicumyl peroxide, and azodicarbonamide.

In operation 101, a primer is applied to the surface of the low surface energy substrate. The primer may be a flexible, non-slip, durable, rubber coating. It may, for example, comprise 1-Chloro-4-(trifluoromethyl) benzene, 6-di-tert-pentylphenol 2-(2H-Benzotriazol-2-yl) and amorphous, precipitated and gel silica and pigments. An exemplary primer that maybe used in embodiments of the invention is Performix® Plasti Dip® Spray 50. The primer layer acts as a reinforcement to the substrate. With the primer layer, a force applied to the surface of the substrate that would normally cause tearing of the surface and removal of the ink, does not cause tearing of the surface or removal of the ink because the primer spreads the applied force across the surrounding primer. The primer is applied using a spray coating system. The system may be automated and may use a pressure pot spray system that oscillates as the substrate passes underneath it on a conveyor system. Once the primer is applied, it is allowed to air dry in operation 102. The amounts of time needed to allow the primer to dry depends on environmental conditions, but is usually about 25 minutes. The primer coat may be between 4 mm and 6 mm, although other thicknesses of the primer coat can be used. A thickness between 4 mm and 6 mm is generally enough to form a long lasting and strong bond but not too thick as to increase cost or create a layer that in itself is so robust so that it can be easily caught and pulled on causing it to separate from the substrate. If the primer coat is not thick enough, additional spray coating passes of the primer can be made in operation 103. Such additional coating passes can be done about 10 to 15 minutes after the original or prior primer coat. The full 25 minutes to allow the primer to dry does not have to be passed prior to adding addition primer coats. The amounts of time needed between additional coats will vary depending on environmental conditions; however, the prior coat should be dry to the touch prior to applying the next coat.

Once the primer coat is dry, a printer can be used to print a graphic, design or other ornamental feature on the primed surface of the substrate in operation 104. The printer may be an ultraviolet (UV) flatbed printer, such as, for example, a Canon® Océ Arizona 660 XT Series UV Flatbed Printer. An inkjet ink that can withstand extended wear and UV exposure should be used to print on the primed surface of the substrate. An exemplary ink that may be used with embodiments of the invention is the Fujifilm® IJC258 UV Curable Ink; however, other extended wear UV inks may be used as well.

Once the graphic, design or other ornamental feature has been printed on the primed surface of the substrate, a clear coating is applied in operation 105. The clear coating may be a, flexible, thermoformable, UV cured clear coating, such as, for example, InstaCure SuperFlex Gloss. The clear coat may be applied using a roll coater or a curtain coater. After application of the clear coat, the clear coat is cured in operation 106 by passing the substrate under a bank of UV lights. Once cured, the clear coat is more resistant to wear and chemicals so that the printed substrate can be used in a variety of different applications including marine and other aqueous environments.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A method for printing on a substrate comprising:
   applying a primer to a surface of a substrate, creating a primed substrate surface;
   allowing the primer to air dry;
   printing ink on the primed substrate;
   applying a clear coat to the printed and primed substrate; and
   curing the clear coat;
   wherein the primer is a rubber coating.

2. The method of claim 1, further comprising adding one or more additional coats of primer and allowing the primer to dry prior to the operation of printing ink.

3. The method of claim 1, wherein the operation of printing ink on the primed substrate is performed by a UV flatbed inkjet printer.

4. The method of claim 1, wherein the operation of applying a clear coat to the printed and primed substrate is executed using a roll coater.

5. The method of claim 1, wherein the operation of applying a clear coat to the printed and primed substrate is executed using a curtain coater.

6. The method of claim 1, wherein the substrate is selected from the group consisting of thermoplastic polyolefin, polypropylene, polyethylenes (PE), polystyrene, nylon, and ethylene-vinyl acetate (EVA).

7. The method of claim 1, wherein the substrate is a foam comprising PE and EVA.

8. The method of claim 1, wherein the substrate comprises talc, calcium carbonate (CaCO3), zinc dioxide (ZnO), dicumyl peroxide, and azodicarbonamide.

* * * * *